No. 637,011. Patented Nov. 14, 1899.
E. W. McCASLIN.
VALVE FOR INFLATION.
(Application filed Sept. 22, 1899.)
(No Model.) 2 Sheets—Sheet 1.
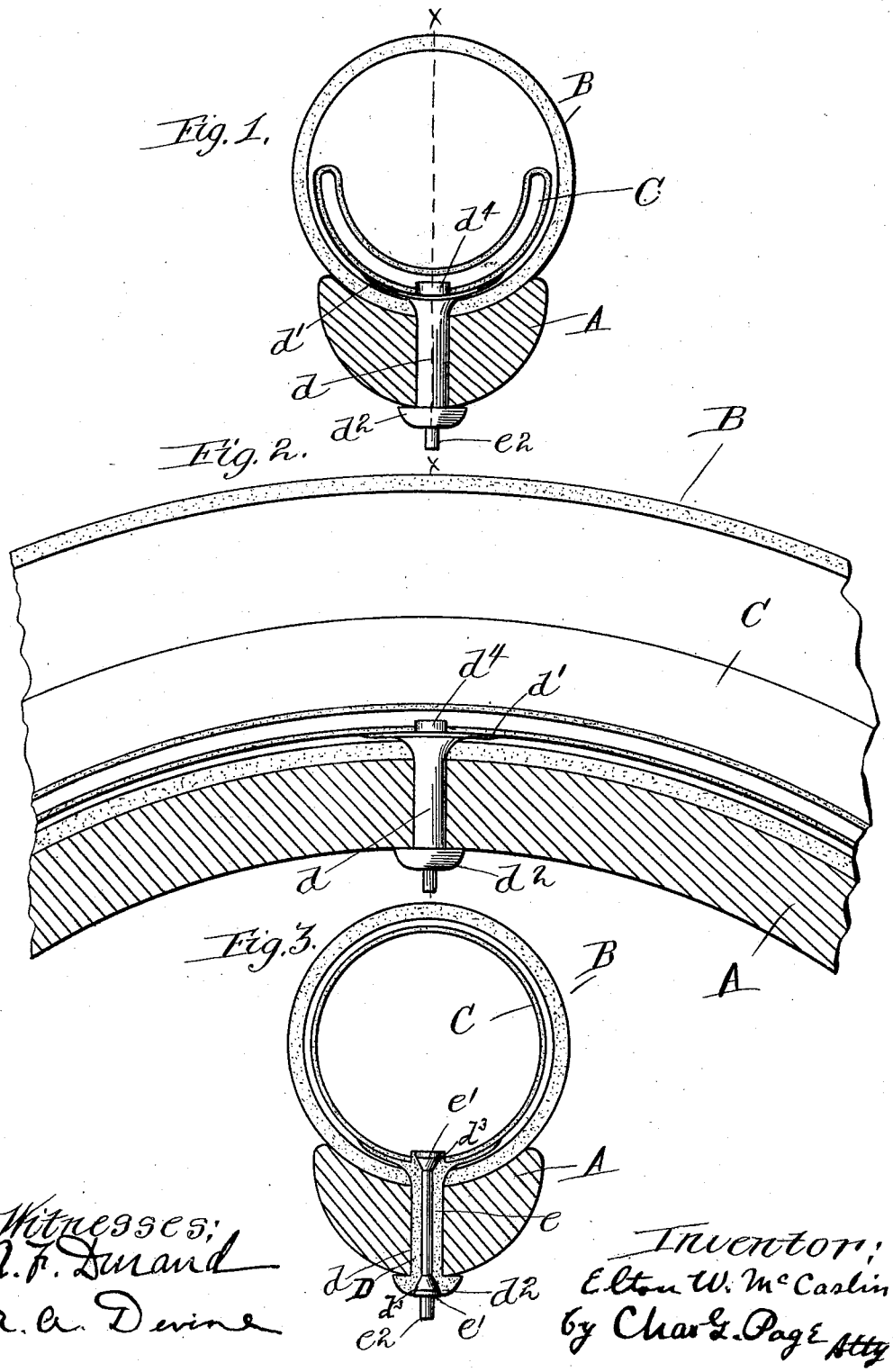

No. 637,011. Patented Nov. 14, 1899.
E. W. McCASLIN.
VALVE FOR INFLATION.
(Application filed Sept. 22, 1899.)
(No Model.) 2 Sheets—Sheet 2.
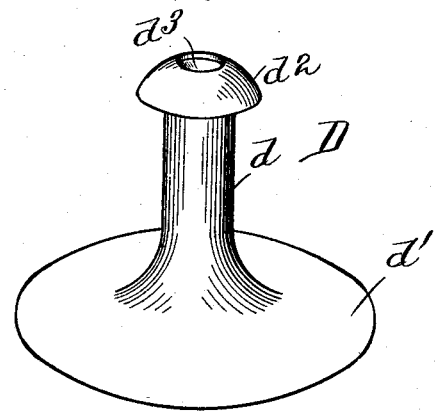
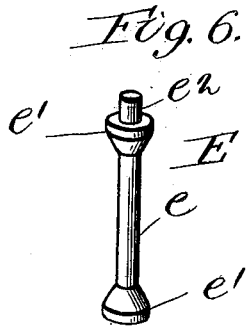
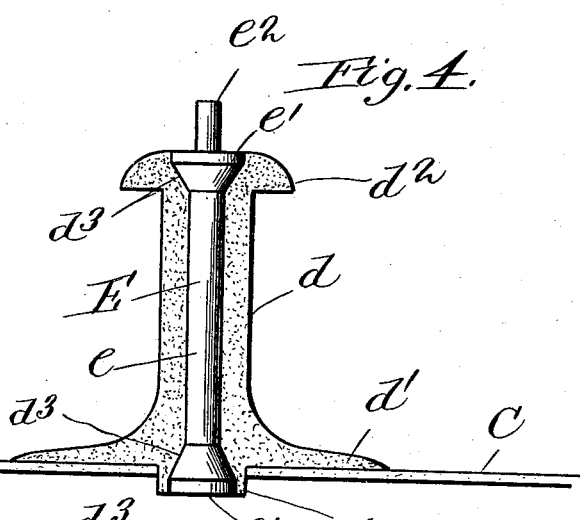
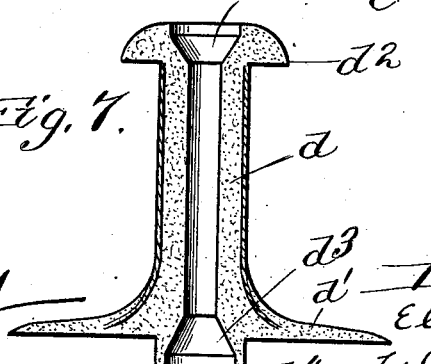
Witnesses: A. F. Denard, A. A. Devine
Inventor: Elton W. McCaslin
by Chas. L. Page Atty

UNITED STATES PATENT OFFICE.

ELTON W. McCASLIN, OF CHICAGO, ILLINOIS, ASSIGNOR TO THE MORGAN & WRIGHT, OF SAME PLACE.

VALVE FOR INFLATION.

SPECIFICATION forming part of Letters Patent No. 637,011, dated November 14, 1899.

Application filed September 22, 1899. Serial No. 731,305. (No model.)

*To all whom it may concern:*

Be it known that I, ELTON W. MCCASLIN, a citizen of the United States, residing at Chicago, in the county of Cook, State of Illinois, have invented a certain new and useful Improvement in Valved Double-Tube Pneumatic Tires, of which the following is a specification.

The objects of my invention are to provide double-tube pneumatic tires with an extremely simple construction of valve-casing and valve, to avoid leakage of air from the inner tube, to detachably connect the valve-casing with the wheel-rim in a simple way, to permit the valve-casing to be readily connected with and disconnected from the wheel-rim, to avoid the use and expense of metal nuts and screw-threading, and to provide certain matters of construction and detail serving to simplify and increase the general efficiency of valve devices for double-tube tires.

To the attainment of the foregoing and other useful ends, my invention consists in matters hereinafter set forth.

In the accompanying drawings, Figure 1 is a section taken transversely through a double-tube pneumatic tire seated upon a wheel-rim and provided with my improved valve device, the inner tube being in a deflated condition and the valve-casing being shown in elevation. Fig. 2 is a like section, on line $x$ in Fig. 1, through a portion of the rim and tire, the valve being in elevation. Fig. 3 is a view similar to Fig. 1, but with the inner tube inflated and the valve-casing in section. Fig. 4 is a section taken centrally through the valve device and centrally and longitudinally through a portion of a deflated inner tube, the valve being in elevation. Fig. 5 shows the valve-casing in perspective. Fig. 6 is a perspective view of the double valve. Fig. 7 shows the valve-casing in central section with its stem or body reinforced by fabric.

It is understood that the wheel-rim A is in practice a circular rim of any ordinary or desired construction and that the tire-casing B is an annular tubular structure of any ordinary or suitable make, it being usually composed of fabric and rubber. The inner inflatable air-tube C may be of any known or suitable construction adapted for use in a double-tube tire and is made independent of the casing. The tire thus described may, for example, be of the well-known "Morgan & Wright" type of tire. The valve-casing D is elastic or flexible and is essentially composed of rubber and molded with a tubular stem or body $d$, having at one end a flat spread-out base $d'$ and at its opposite end laterally enlarged to form a head $d^2$. The tubular bore of the stem extends through both the head and base of the structure and is expanded at each end to form conical inwardly-tapering valve-seats $d^3$. The valve E is composed of rubber and is molded with a stem $e$, having valves proper, $e'$, at each end, so as to form a double valve. The valve-stem is also continued in a contracted form a short distance beyond one of the valves, as at $e^2$, so as to provide a short projection which can be taken hold of for drawing the outer valve from its seat, it being understood that by the term "outer valve" is meant the valve remote from the inner tube and that by the term "inner valve" is meant the valve nearest in point of position to such inner tube. The flat spread-out base $d'$ of the valve-casing is cemented to the outer side of the inner air-tube C, which latter is provided with a small opening in register with the bore of the valve-casing, and preferably the base of the valve-casing is molded with a short boss $d^4$, which fits in the hole in the inner tube. With this arrangement the bore of the stem or body $d$ of the valve-casing is continued through the boss $d^4$ and expanded therein to form the inner conical valve-seat. This permits the flat base to be made quite thin and at the same time affords an elastic valve-seat having a suitably thick wall adapted to withstand pressure resulting from the crowding of the valve in the hollow conical seat. By making the flat base thin it will readily curve transversely when the inner tube is inflated, as in Fig. 3, and also readily accommodate itself to any action or condition of the inner tube. The valve-seat for the outer valve is formed in the head $d^2$ at one end of the stem or body of the casing, which said head provides a suitably thick elastic wall around the conical or tapered portion of the bore which forms the outer valve-seat and involves the advantages secured by forming the inner valve-seat in the elastic boss $d^4$. The valve-stem is arranged within the bore of the casing and is of less diameter than the diameter of such bore, said valve-stem being of such length that it will normally hold the valves seated and be under sufficient longitudinal tension to normally maintain the valve thus seated. The stem portion $d$ of the valve-casing is of a length to extend through both the casing B and an opening $a$ in the wheel-rim A, the head $d^2$ of the valve-casing when the latter is applied being adapted to bear against the inner side of the wheel-rim. In order to inflate the inner tube, the operator can take hold of the projection $e^2$ on the outer valve and draw the latter out from its seat to an extent to permit the nozzle of an air-pump to be introduced into the casing to a suitable extent, and as the head $d^2$ and valve are elastic the material of which they are composed will, while yielding to the pump-nozzle, clasp or crowd around the same to an extent to render it practical to pump air into the inner tube. When the pump is thus applied and operated, the inner valve—that is to say, the valve nearest the inner tube—will work automatically. In order to deflate the inner tube, the operator will draw the outer valve out from its seat and then push the inner valve inwardly by any suitable instrument, such as a small metal rod or stem introduced within the bore of the valve-casing from the outer end thereof.

What I claim as my invention is—

The combination with the wheel-rim and a double-tube tire seated thereon and comprising a casing containing a removable, inflatable air-tube, of a rubber valve-casing molded with a tubular rubber stem or body extending from the inner side of the tire-casing to and through an opening in the wheel-rim and having at one end a rubber flange forming a spread-out base which is cemented to the outer side of the inner tube, and having at its opposite end an enlargement forming a head which bears against the inner side of the wheel-rim; a rubber valve device molded with a couple of rubber valves connected by a rubber stem; the bore of the valve-casing being extended through its base and head and being expanded at its ends to form conical, inwardly-tapering valve-seats in which the valves are normally seated by the action of the valve-stem which is under constant tension.

ELTON W. McCASLIN.

Witnesses:
ARTHUR F. DURAND,
AGNES A. DEVINE.